United States Patent [19]

Mangrulkar

[11] Patent Number: 5,423,199
[45] Date of Patent: Jun. 13, 1995

[54] METHOD AND APPARATUS FOR MONITORING STAMPING PRESS PROCESS

[75] Inventor: Suresh M. Mangrulkar, Farmington Hills, Mich.

[73] Assignee: Ford Motor Company, Dearborn, Mich.

[21] Appl. No.: 116,188

[22] Filed: Sep. 3, 1993

Related U.S. Application Data

[63] Continuation-in-part of Ser. No. 991,071, Dec. 14, 1992, Pat. No. 5,311,759.

[51] Int. Cl.⁶ .................... B21D 5/01; G06F 15/46
[52] U.S. Cl. ............................ 72/3; 72/12; 72/21; 364/552
[58] Field of Search .................... 72/3, 12, 19, 21; 364/522

[56] References Cited

U.S. PATENT DOCUMENTS

| | | | |
|---|---|---|---|
| 3,930,248 | 12/1975 | Keller | 340/267 |
| 4,023,044 | 5/1977 | Miller et al. | 307/116 |
| 4,099,408 | 7/1978 | Ludwigson | 73/95 |
| 4,548,066 | 10/1985 | Martinez et al. | 73/1 J |
| 4,567,774 | 2/1986 | Manahan et al. | 73/826 |
| 4,633,720 | 1/1987 | Dybel et al. | 73/862.53 |
| 4,734,869 | 3/1988 | Mickowski | 364/550 |
| 4,750,131 | 6/1988 | Martinez | 364/476 |
| 4,819,467 | 4/1989 | Graf et al. | 72/19 |
| 4,852,397 | 8/1989 | Haggag | 73/82 |
| 4,987,528 | 1/1991 | O'Brien | 364/184 |
| 5,271,254 | 12/1993 | Gloe et al. | 72/19 |
| 5,297,478 | 3/1994 | Jartyn et al. | 72/19 |
| 5,311,759 | 5/1994 | Mangrulkar et al. | 72/12 |

*Primary Examiner*—David Jones
*Attorney, Agent, or Firm*—Roger L. May; Joseph W. Malleck

[57] ABSTRACT

Method of and system for monitoring the operation of a stamping press including a punch and a die for forming parts from a blank based on processed punch tonnages measurements at predetermined locations in the working stroke. The method includes selecting at least two punch locations at which a press variable measurement will be made and operating the stamping press so as to produce production parts to measure a production press operating variable at the locations for each production part produced. The method also includes processing the production press operating variables to obtain production operating parameters and comparing the production operating parameters to predetermined operating limits representing limits within which the variation in blank thickness and work hardening coefficient of the sheet metal are in control and acceptable stampings are being produced.

10 Claims, 4 Drawing Sheets

| FILE  SETUP  RUN  SIGNATURE  REVIEW  SYSTEM | | | 15:46:14 |
|---|---|---|---|

| Baseline Data | Baseline Hit 30 | | Signal | Mean | Stand. Dev. |
|---|---|---|---|---|---|
| OT | 175.23 | tons | OT | 173.818 | 1.579 |
| OTLR% | -22.95 | % | OTLR% | -23.749 | 0.211 |
| OTRR% | -16.82 | % | OTRR% | -16.021 | 0.688 |
| OTLF% | 30.84 | % | OTLF% | 31.404 | 0.555 |
| OTRF% | 8.93 | % | OTRF% | 8.366 | 0.289 |
| IT | 253.14 | tons | IT | 252.71 | 1.395 |
| ITLR% | -12.88 | % | ITLR% | -13.284 | 0.433 |
| ITRR% | -4.02 | % | ITRR% | -3.797 | 0.311 |
| ITLF% | 18.28 | % | ITLF% | 18.81 | 0.259 |
| ITRF% | -1.38 | % | ITRF% | -1.728 | 0.265 |
| Th30 | -0.003 | inch | Th30 | 0 | 0.0015 |
| dN | 0.002 | inch | dN | 0 | 0.0050 |
| IWLR% | -26.92 | % | IWLR% | -28.42 | 1.194 |
| IWRR% | -16.10 | % | IWRR% | -15.007 | 0.805 |
| IWLF% | 40.31 | % | IWLF% | 41.119 | 1.435 |
| IWRF% | 2.71 | % | IWRF% | 2.307 | 0.557 |
| Return -- New Test, Esc -- Main Menu | | | CT | 2 | 0.01 |

METHOD AND APPARATUS FOR MONITORING STAMPING PRESS PROCESS

CROSS-REFERENCE TO RELATED APPLICATION

This application is a continuation-in-part of U.S. Pat. application Ser. No. 07/991,071, filed Dec. 14, 1992, now U.S. Pat. No. 5,311,759 which is assigned to the assignee of the present invention.

TECHNICAL FIELD

The present invention relates to a method and apparatus for monitoring a stamping press process.

BACKGROUND ART

Sheet metal remains the primary material utilized in the making of an automobile body, despite the advent of plastics technology. Sheet metal body parts, such as fenders and quarter panels, are formed from metal blanks utilizing conventional stamping presses.

The prior art includes patents directed toward monitoring stamping presses or metal forming operations, such as U.S. Pat. Nos. 3,930,248, issued to Keller, 4,023,044, issued to Miller et al., and 4,750,131, issued to Martinez. The '131 patent discloses a method of detecting faulty parts in a progressive die press having a plurality of forming stations, each of which includes a forming tool and a force transducer. The method includes the steps of producing a preselected number of sample parts while collecting reference force data from the force transducers for a plurality of displacements. The reference force data and the displacement data are applied to a processor which produces a reference curve for each of the forming stations. Production force data are provided to the processor and compared to the curve for each of the displacements and for each of the forming stations. A faulty part is indicated when the production force data for at least one of the displacements is different from the reference force data of the reference curve by a preselected difference.

In any metal stamping process, the thickness of the blank and the work hardening coefficient of the material are two important characteristics that determine stamping quality. The blank thickness is also important for compliance with Federal Motor Vehicle Safety Standards, which specify a certain thickness for automobile bodies. Thus, if the blank thickness falls below a certain level, any parts produced therefrom are unacceptable and become scrap.

Work hardening coefficient is important from the point of view of drawability. Work hardening coefficient can be measured in different ways, such as the limited dome height (LDH) test, which is performed on the incoming material. In spite of all the quality assurances provided by suppliers, the incoming material still needs to be monitored. This usually happens in the form of a spot-check at the stamping plant. Even with the spot-checks, splits in the stamped metal body panels can occasionally occur, due to improper work hardening coefficient.

These splits and cracks not only produce a lot of scrap, they result in production delay. Previously, monitoring the thickness of steel stock manual measurement of the thickness using a tool, such as a micrometer, and measurement of the work hardening coefficient required laboratory instrumentation.

Accordingly, there is a need to be able to measure the blank thickness and the work hardening coefficient of the material in an on-line fashion, while the parts are being produced, so that appropriate action can be taken to prevent the formation of any defective parts or production delays.

SUMMARY OF THE INVENTION

It is therefore an object of the present invention to provide a method for measuring the variation in the blank thickness and the work hardening coefficient of stamping material in an on-line fashion, while the parts are being produced.

In carrying out the above object and other objects and features of the present invention, there is provided a method of monitoring the operation of a stamping press including a punch and a die for forming parts from a blank. The method comprises selecting at least two punch locations at which a press variable measurement will be made and operating the stamping press so as to produce production parts to measure a production press operating variable at the locations for each production part produced. The method also comprises processing the production operating variables to obtain production operating parameters, and comparing the production operating parameters to predetermined operating limits representing limits within which the stamping process is in control or producing acceptable parts, for the purposes of process control.

In one preferred embodiment, the method also comprises operating the stamping press so as to produce a predetermined number of baseline parts to measure a baseline mean press operating variable at the locations, and the step of processing may include determining a deviation of the production press operating variables from the baseline mean press operating variables. The step of processing may include estimating a deviation in the blank thickness (dTh), based on the production press operating variables for the locations, according to the following relationship:

$$dTH = ((\Delta L f_2 + \Delta L f_1)/2) * (B_t)$$

wherein $\Delta L f_2$ and $\Delta L f_1$ are deviations in the production press operating variables from associated baseline mean press operating variables expressed as fractions, and $B_t$ is the thickness of the blank used to form the baseline parts. Still further, the step of processing may include estimating a parameter dN proportional to a deviation in the work hardening coefficient, based on the production press operating variables for the locations, according to the following relationship:

$$dN = (\Delta L f_2 - \Delta L f_1)$$

A system is also provided for carrying out the method.

The advantages accruing to the present invention are numerous. For example, the method and apparatus of the present invention permit the detection of unacceptable blank thickness and work hardening coefficient in an on-line manner while parts are being produced. As a result, a press operator can identify when corrective action needs to be taken and take the action prior to the production of defective parts and prior to the unnecessary production delays. Additionally, consistency of stampings is improved, thereby improving the overall fit and finish of the automobile body parts. This also results in tangible cost savings derived from reduced scrap and rework.

The above object and other objects, features, and advantages of the present invention will be readily appreciated by one of ordinary skill in the art from the following detailed description of the best mode for carrying out the invention when taken in connection with the accompanying drawings.

BEST MODE FOR CARRYING OUT THE INVENTION

Figure 1:
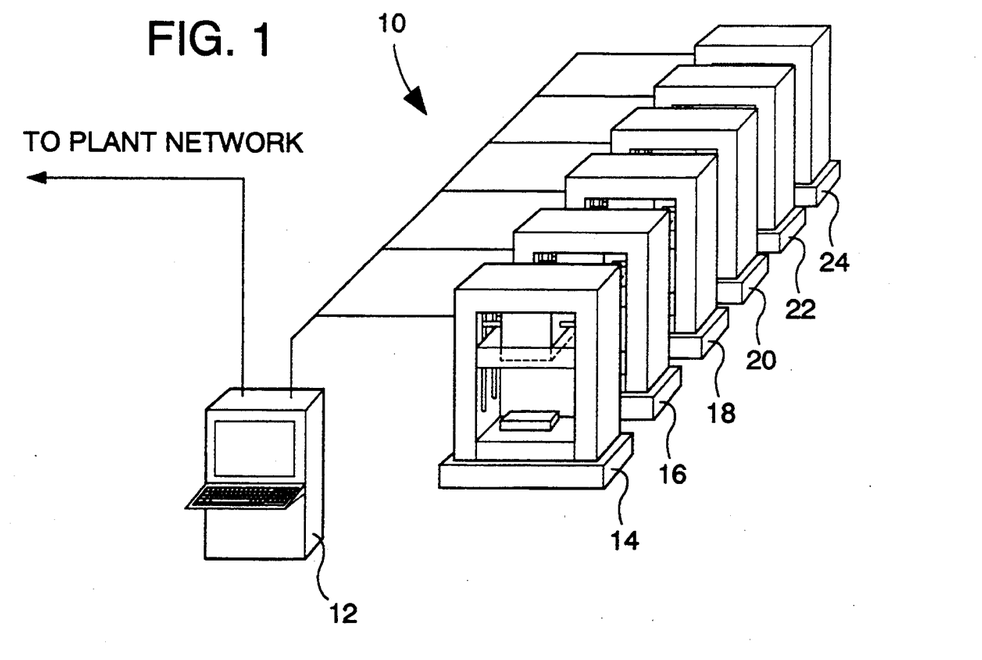
FIG. 1 is a perspective view of a typical press line including a process monitoring system for monitoring press operation according to the present invention.

Referring now to FIG. 1, there is shown a perspective view of a typical press line shown generally by reference numeral 10. As shown, the press line includes a plurality of presses 14–24, each for performing a certain metal forming operation on a blank of material (e.g. metal) during a production cycle. For example, the presses might sequentially perform the following metal forming operations: double-action draw, trim and pierce, cam flange/form/trim, cam flange/pierce, cam flange/ pierce/restrike, and cam curl/pierce/form.

Figure 2:
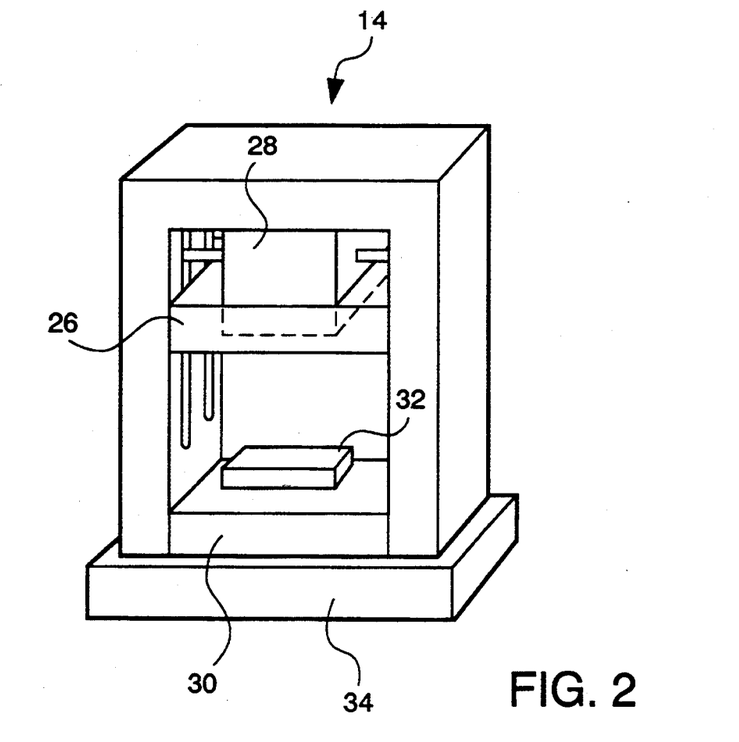
FIG. 2 is a perspective view of a press, such as a double-action draw press shown in FIG. 1.

As shown in FIG. 2, a double-action draw press 14 includes an upper binder 26, an upper punch 28, a lower binder 30 and a lower punch 32. Although other types of presses are possible, press 14 is an underdrive press, including a motor (not specifically illustrated) located under the press base 34. As is known, a plurality of pull rods are located in the press 14, extending upward from the motor to a crankshaft for moving the upper binder and upper punch in a downward direction. Strain gauges collect data during press operation and can be mounted at a number of locations on the press, such as the pull rods, the press columns or the pitman arms, or inside the dies. Preferably, the strain gauges are mounted as close as possible to the stamping die. The press also includes an encoder not specifically illustrated for measuring the stroke positions of the two rams of the press. When a blank of material, such as sheet metal, is placed in the press 14, the upper binder is moved down and clamps the blank. The upper punch continues to move downward and, in cooperation with the lower punch, forms the part.

Referring again to FIG. 1, the press line also includes a process monitoring system 12. Although only one process monitoring system is shown, a plurality of process monitoring systems could be utilized. The process monitoring system 12 executes a monitoring program for monitoring operation of the individual presses 14–24 based on data received from the presses, such as from the strain gauges. The system also generates process control information, as described in greater detail herein below.

In the preferred embodiment, the monitoring program is designed to allow a user to easily acquire data from an operating press or similar machine while monitoring the quality of the parts being produced. The user interface of the monitoring program makes use of screen windowing and manipulation routines. User selectable commands are organized into menus and submenus which are traversed with the aid of the cursor keys on a keyboard (not specifically shown), or other input device. The monitoring program, preferably written in the C computer language, makes use of a variety of libraries for general purpose functions, data analysis and graphic presentations, and the like.

The monitoring program operates on any standard computer, such as an IBM or IBM compatible machine, equipped with an analog-to-digital (A/D) card for data acquisition, such as part number DAS16F, commercially available from Metrabyte. The computer also preferably has at least 640K of random access memory (RAM) and an EGA compatible color graphics card and monitor. A hard disk is preferred as the main storage media, as is a floating point coprocessor, since much of the monitoring program is very computation oriented. The process monitoring system and the monitoring program is described in greater detail in patent application Ser. No. 07/991,071, titled "Method and System For Real-Time Statistical Process Monitoring", filed on Dec. 14, 1992, and assigned to assignee of the present invention, the specification of which is hereby expressly incorporated by reference in its entirety.

With continuing reference to FIG. 2, in a draw operation as the upper binder 26 and upper punch 28 moves down toward the lower binder 30 and lower punch 32, as the press moves down towards the bottom, there is an increase in tonnage. This increase in tonnage is due to the work hardening of the sheet metal, i.e. the work hardening coefficient of a material resists the drawing operation, actually making it harder to draw as the drawing operation progresses. Without this characteristic of the material, metal forming would be impossible.

Generally, assuming the friction between the forming die and the blank to be constant, the tonnage profile during forming operation depends upon two things; the work hardening coefficient and the blank thickness. An increase in the tonnage curve is directly proportional to the increase in blank thickness with all else being constant, i.e., if the thickness increases by 10%, the tonnages would similarly increase by about 10%.

On the other hand, the relationship between work hardening coefficient and tonnage profile is different. With thickness being the same, if the work hardening coefficient increases, the material will work harden faster with the stroke, which will be reflected in the rate at which the tonnage increases with the stroke. More particularly, the change in slope of the tonnage over stroke of the press determines the work hardening coefficient, while the average shift in the tonnage determines the thickness. This characteristic may be used for monitoring the blank thickness and work hardening coefficient, which have been very difficult to monitor in the past.

In the preferred embodiment, two locations are identified in the punch travel at which points tonnage measurements or variable measurements are to be made during the forming operation. These tonnage measurements can then be processed to obtain parameters from which deviations in blank thickness and work hardening coefficient can be identified, as described in greater detail below. Preferably, the two locations should be selected so as to cover 70%–80% of the working stroke. That is, one should be in the beginning of the stroke, at about 10%–15% of the travel of the upper binder 26 and upper punch 28, and the other location should be toward the end, at about 85%–90% of the travel of the upper binder 26 and upper punch 28. It should be noted that, because of variability and the fact that the difference in tonnage at these locations is to be determined, the two locations should not be too close to each other. If a measurement is made at a certain point over and over again, there will always be some variation. If the second tonnage measurement is made at a point very close to the location of the first tonnage measurement, the difference of these two large numbers results in a very small number. When this small number is then utilized to determine slope, inaccuracies can result. Furthermore, the locations should not be too far apart toward the beginning and end of the stroke, or else inaccuracies in tonnage measurements might result. For instance, a tonnage measurement made at the bottom of the working stroke does not accurately reflect the amount of tonnage that goes into forming the metal. Toward the bottom, the amount of tonnage is a combination of the forming as well as the bottoming out of the die.

For a low-carbon sheet steel, the shape of the plastic portion of the tension stress-strain curve, expressed in terms of true stress and true strain, may be described by the following parabolic equation:

$$\sigma = K\epsilon^n \quad (1)$$

where $\sigma$ = true stress; $\epsilon$ = true strain; n = strain-hardening exponent; and K = strength coefficient. These true stress and strain have counterparts, nominal stress (S) and nominal strain (e) that are calculated based on the original dimensions of the material prior to its deformation. We know that they are related according to the following equations:

$$\epsilon = \ln(1 + e) \quad \sigma = S*(1 + e) \quad (2)$$

Substituting yields:

$$S*(1 + e) = K*[\ln(1 + e)]^n \quad (3)$$

The nominal stress and nominal strain measurements at the punch position "i" during the draw operation will be:

$$S_i*(1 + e_i) = K*[\ln(1 + e_i)]^n \quad (4)$$

For a given part design and draw operation, the nominal stress can be expressed as:

$$S_i = \frac{L_i}{a_i * t} \quad (5)$$

where $a_i$ normalizing factor for computing the nominal stress from blank thickness "t" at the punch position "i", t = blank thickness, and $L_i$ = instantaneous punch tonnage @ punch location "i". Substituting $S_i$ into Equation 4 yields:

$$\frac{L_i*(1 + e_i)}{a_i * t} = K*[\ln(1 + e_i)]^n \quad (6)$$

Solving for $L_i$:

$$L_i = \frac{a_i * K}{(1 + e_i)} * t * [\ln(1 + e_i)]^n \quad (7)$$

Restated:

$$L_i = A_i * t * [\ln(1 + e_i)]^n \quad (8)$$

assuming $$A_i = \frac{a_i * K}{(1 + e_i)} \quad (9)$$

Converting Equation 8 into logarithmic form yields:

$$\log(L_i) = \log(A_i) + \log(t) + n*\log[\ln(1 + \epsilon_i)]$$

Partial differentiation of both sides yield:

$$\frac{\delta L_i}{L_i} = \frac{\delta t}{t} + \log[\ln(1 + \epsilon_i)] * \delta n \quad (10)$$

assuming the only change in material is the blank thickness "t" and the work hardening coefficient "n". The strength coefficient K is determined by the basic formulation and structure of steel and is assumed to be constant. Also for a given part and die set $a_i$ (and therefore $A_i$) and $e_i$ depend only on "i". Consequently, these parameters are constant for a given punch location.

For a small change in t and n:

$$\frac{\Delta L_i}{L_i} = \frac{\Delta t}{t} + \log[\ln(1 + e_i)] * \Delta n \quad (11)$$

At any locations "" of the punch, let $$\Delta Lf_i = \frac{\Delta L_i}{L_i} \quad (12)$$

$$\Delta tf = \frac{\Delta t}{t}$$

$\Delta Lf_i$ equals fractional tonnage variation and $\Delta tf$ equals fractional blank thickness variation. Substituting yields:

$$\Delta Lf_1 = \Delta tf + \text{Log}[\ln(1 + \epsilon_i)]*\Delta n \quad (13)$$

For any two punch locations, i = 1 and 2:

$$\Delta Lf_1 = \Delta tf + \text{Log}[\ln(1 + \epsilon_1)]*\Delta n$$

$$\Delta Lf_2 = \Delta tf + \text{Log}[\ln(1 + \epsilon_1)]*\Delta n \quad (14)$$

Subtracting the above equations yields:

$$(\Delta Lf_2 - \Delta Lf_1) = \Delta n * \log[\ln(1 + \epsilon_2)] - \log[\ln(1 + \epsilon_1)]$$

$$\Delta n = \frac{(\Delta Lf_2 - \Delta Lf_1)}{\log[\ln(1 + \epsilon_2)] - \log[\ln(1 + \epsilon_1)]}$$

-continued $$\Delta n = C_{2,1} * (\Delta L f_2 - \Delta L f_1) \qquad (15)$$

wherein $C_{2,1} = 1/\{\log[\ln(1+\epsilon_2)] - \log[\ln(1+\epsilon_1)]\}$ and for a given design of panel and die set, $C_{2,1}$ is constant for a given set of punch locations 1 and 2 representing the punch tonnages. Thus, for a given set of punch locations 1 and 2:

$$\Delta n \alpha (\Delta L f_1 - \Delta L f_1) \qquad (16)$$

For $\Delta = 0$ $$\Delta tf = \Delta L f_1 = \Delta L f_2 = \mathrm{Avg}(\Delta L f_i) \qquad (17)$$

The best estimate of $\Delta tf =$ $$\frac{(\Delta L f_2 - \Delta L f_1)}{2} \qquad (18)$$

Figure 3:
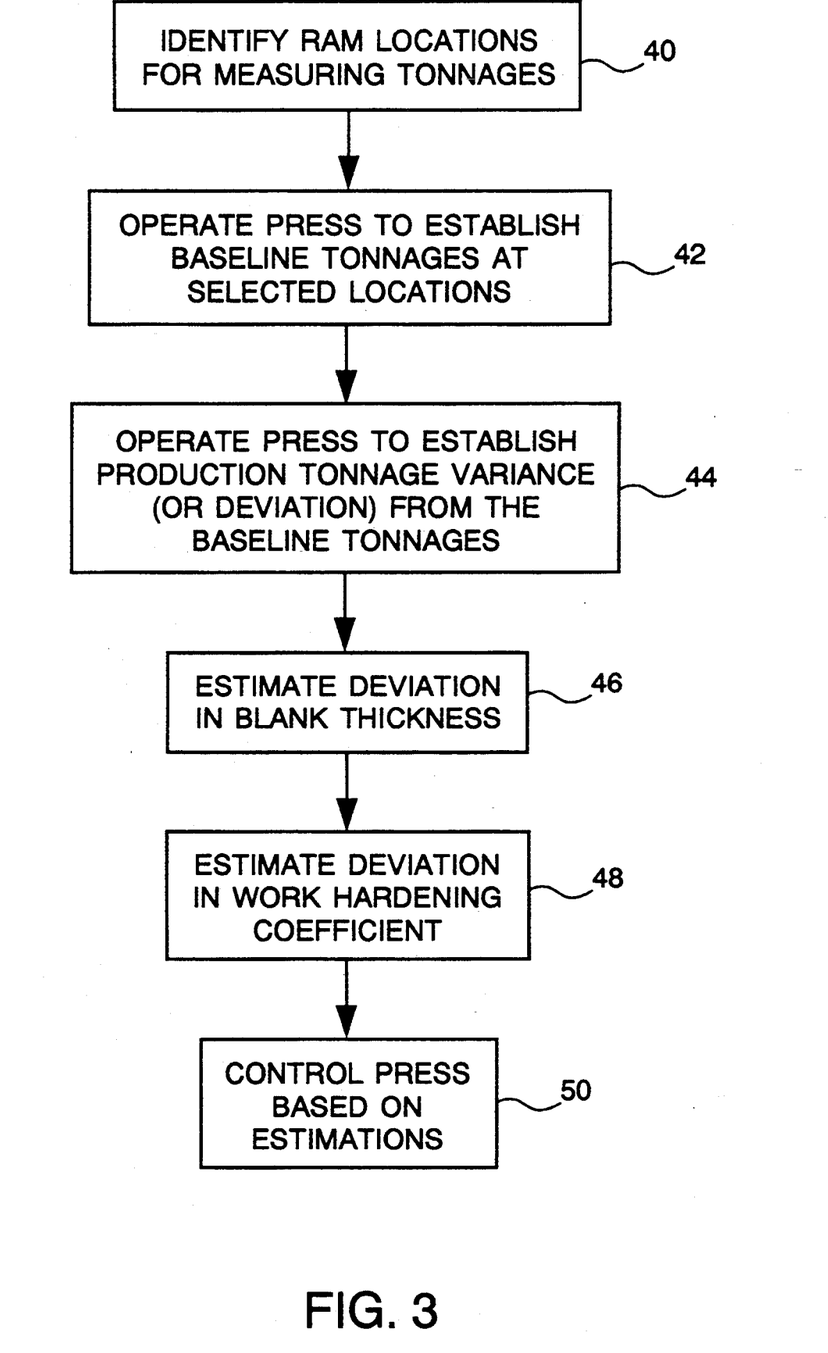
FIG. 3 is a flowchart detailing the steps for monitoring blank thickness and work hardening coefficient from punch tonnage measurements according to the present invention.

Referring now to FIG. 3, there is illustrated a high-level flowchart detailing the methodology of the present invention. In the preferred embodiment, the blank thickness and work-hardening coefficient of sheet steel is monitored in a metal forming process as a variance from a reference baseline. At step 40, the two arbitrary punch locations (i = 1 and 2) for measuring the loads are selected. As previously discussed, these locations should preferably be as far apart as possible within the working stroke of the punch.

With continuing reference to FIG. 3, at step 42 a baseline is established. Once you have a borderline or a stable manufacturing process, the baseline is obtained by measuring tonnages at those two locations and determining an average of a predetermined number of samples. The baseline is established as a population mean for the loads $L_1$ and $L_2$ at the selected locations. A minimum sample size of 30 cycles, for example, should be used for establishing this mean. Also, the steel used for this reference should have properties representative of the stock used for production. Thereafter, the present invention operates to identify the drift in these tonnages as the production goes on. The present invention utilizes the change in average tonnage to determine blank thickness and the change in slope to determine work hardening coefficient. At step 44, the stamping press is operated to produce production parts and production tonnages are measured at the specified locations for each production part produced, so as to determine change in tonnages from the baseline measurements.

In the preferred embodiment, at steps 46 and 48 the estimated variance of the thickness and the strain-hardening exponent of the steel stock are to be calculated, respectively, from the baseline sample data using the equations shown below. The deviation in the steel thickness measurement ("dTh"), in 0.001, is estimated as follows:

$$dTH = ((\Delta L f_2 + \Delta L f_1)/2)*(B_t) \qquad (19)$$

wherein $\Delta L f_1$ and $\Delta L f_2$ are computed as fractional deviations of loads $L_1$ and $L_2$ from the respective baseline means expressed as a fraction, and $B_t =$ blank thickness of the baseline steel in 0.001. More generally, for additional points along the punch stroke "i", dTh may be determined by multiplying an average of $\Delta L f_i$ by $B_t$. An estimate of a variable "dN" proportional to the deviation in the work hardening coefficient can be determined as follows:

$$dN = (\Delta L f_2 - \Delta L f_1) \qquad (20)$$

Preferably, the control mean is set to zero for both the thickness and the work-hardening coefficient, due to the steel properties being calculated as a variance from the mean of the baseline. Upper and lower control limits for steel thickness (in 0.001") are calculated as ±3 times the standard deviation of the variable dTh above calculated from the baseline data appropriately adjusted for a given subgroup size in production using standard SPC methodology. Upper and lower control limits for the work hardening coefficient for the steel stock are calculated as ±3 times the standard deviation of the variable dN above calculated from the baseline data appropriately adjusted for a given subgroup size in production using standard SPC methodology. If the deviations exceed the control limits (or quality limits discussed in greater detail below), at step 50 the press can be controlled appropriately (e.g. powered down) so as to reduce scrap. A control chart is preferably maintained in real-time in memory for production subgroup averages of variation in blank thickness dTh and the parameter dN calculated using the above-noted equations.

Figure 4A:
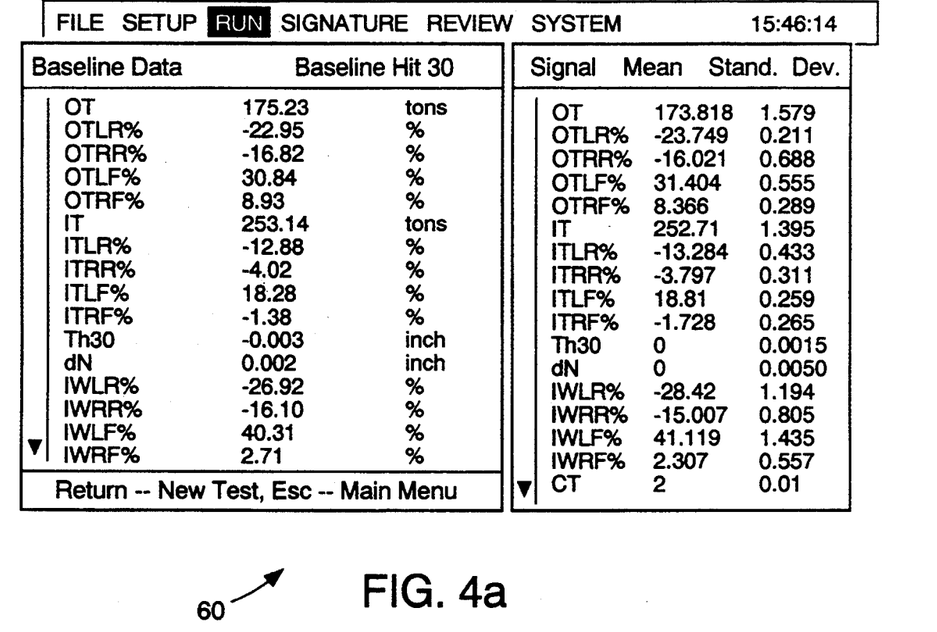
FIGS. 4a–4b are an illustration of screen displays for use with the present invention, illustrating a plurality of features, including deviations in blank thickness and work hardening coefficient, extracted from a press signature and the associated diagnostic statistical process control charts.
Figure 4B:
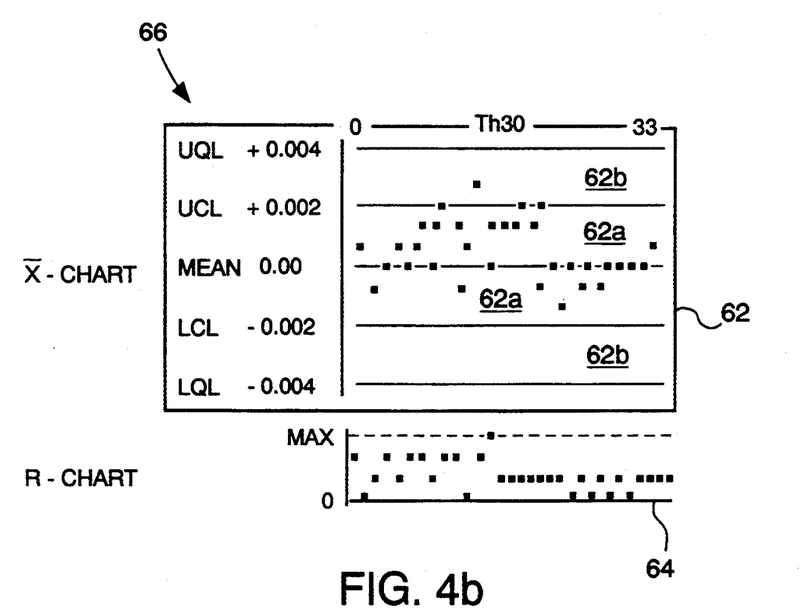

Referring now to FIGS. 4a–4b, process monitoring preferably generates a custom screen which contains a display of features, including blank thickness (t) and work hardening coefficient (n), shown generally by reference numeral 60. As shown, the system is capable of monitoring a number of other features, such as total outer tonnage (OT), total inner tonnage (IT), outer and inner tonnage percentages (OLLR %, OLRR %, OLLF %, OLRF %, ILLR %, ILRR %, ILLF %, ILRF %), inner work percentages (IWLR %, IWRR %, IWLF %, IWRF %) and cycle time (CT). In the preferred embodiment, the operational limits include control limits and quality limits. During process monitoring, statistical process control charts, such as an X-bar chart, shown generally by reference numeral 62 in FIG. 4b, and an R-chart shown generally by reference numeral 64 in FIG. 4b, are generated and updated as data is collected, for each box displayed.

With continuing reference to FIG. 4b, the areas of the X-bar chart shown generally by 62a indicate a feature that is under control, and the areas of the chart shown generally by 62b indicate a feature that has exceeded the control limits, but is within quality limits (i.e. within acceptable part tolerances). Exceeding the control limits signifies that the process is not in statistical control and is indicative of the presence of a special cause of excessive variation. For a process to be considered in control, all of the features should be in the control limits. Exceeding the quality limits signifies a process that will produce out-of-spec parts. The X-bar chart 62 of FIG. 4b shows the blank thickness (t) collected during process monitoring for the press, in relation to the control limits and quality limits determined based on the means and standard deviation associated with the previously collected baseline data.

With continuing reference to FIG. 4b, an SPC chart such as that shown by reference numeral 66 may be created for blank thickness or work hardening coefficient data. Preferably, the charts are created using lines which are color-coded based on the limits of the data: for example, the line plot representing the actual data is white; the mean of the feature is indicated by a yellow line; the upper and lower control limits are indicated by green lines; and the upper and lower quality limits are indicated by red lines.

In the preferred embodiment, the SPC chart includes two forms of control charts: an X-bar chart and an R-chart. These charts explain process data in terms of both location (process average) and spread (piece-to-piece variability). The X-bar chart is a measure for location and is the average of the values in a small subgroup. X-bar is the average for each subgroup and is determined by the following equation:

$$\overline{X} = \frac{X_1 + X_2 + \ldots + X_i + \ldots + X_n}{n} \quad (21)$$

where n = subgroup size and $X_i$ = a data point within the subgroup. Assume that for a stable production process, $X_i$ is normally distributed with production mean and standard deviation of $\mu$ and $\sigma$, respectively. According to sampling theory, X-bar will be normally distributed with standard deviation of $(\sigma/\sqrt{n})$. The control limits (UCL, LCL) for the X-bar chart are, therefore, computed as follows:

$$UCL = \mu + \frac{y\sigma}{\sqrt{n}} \quad (22)$$

$$LCL = \mu - \frac{y\sigma}{\sqrt{n}}$$

where $\mu$ = production mean, as determined from the baseline data; $\sigma$ = production standard deviation, as determined from the baseline data; and y = default value of 3, for a 99.7% confidence level.

Exceeding the control limits is indicative of the process mean drifting out of control due to an attributable cause which needs to be corrected to bring the process back in control. For example, this may be caused by steel from a different batch or supplier with a different characteristics. An out-of-control condition may not always affect the stamping quality. Therefore, in the preferred embodiment, provision has been made on the X-bar chart for the inclusion of quality limits. These limits are preferably determined experimentally to establish the effect of certain variables on stamping quality. These variables include process parameters such as punch tonnage settings as well as steel parameters such as blank thickness and work hardening coefficient. These quality limits, when exceeded, will indicate a significant effect on stamping quality.

The R-Chart (or Range Chart), shown by reference numeral 64 of FIG. 4b, is a measure of spread. Generally, it is represented by the "range" of the data within a subgroup sample. Due to the real-time computer capability of the system, the range calculation is preferably replaced by calculated subgroup standard deviation as the representation of the data spread. Each subgroup data point is, therefore, determined by the following equation:

$$R = \sqrt{\frac{\Sigma (X_i - \overline{X})^2}{n}} \quad (23)$$

According to the sampling theory, for a given production variability and subgroup size, $R^2$ follows a $X^2$ distribution with (n−1) degrees of freedom. The upper control limit (UCL) for the R-Chart is, therefore, determined by the following equation:

$$UCL = \sqrt{\frac{X^2_{99} * \sigma^2}{n}} \quad (24)$$

where $X^2_{99}$ = the $X^2$ distribution with 99% confidence factor for n−1 degrees of freedom; $\sigma$ = standard deviation derived from the baseline data; and n = subgroup size. Any out of range condition in the R-Chart will be indicative of change in process capability. This condition may not be correctable by shifting the process means by simply resetting the die, and may possibly require process or machine maintenance.

The following truth table may be used for concluding the diagnosis of the material properties when other press settings are within control limits:

| dTh | dN | Conclusions |
| --- | --- | --- |
| In Control | In Control | Blank thickness and work hardening coefficient of the material are in control |
| In Control | Out of Control | Work-hardening coefficient drifted; blank thickness is in control |
| Out of Control | In Control | Blank thickness drifted; work hardening coefficient is in control |
| Out of Control | Out of Control | Work-hardening coefficient drifted; blank thickness may or may not be in control |

If the control limits and/or the quality limits have been exceeded, an appropriate alarm, such as a visual or audio indicator, can be activated.

Figure 5:
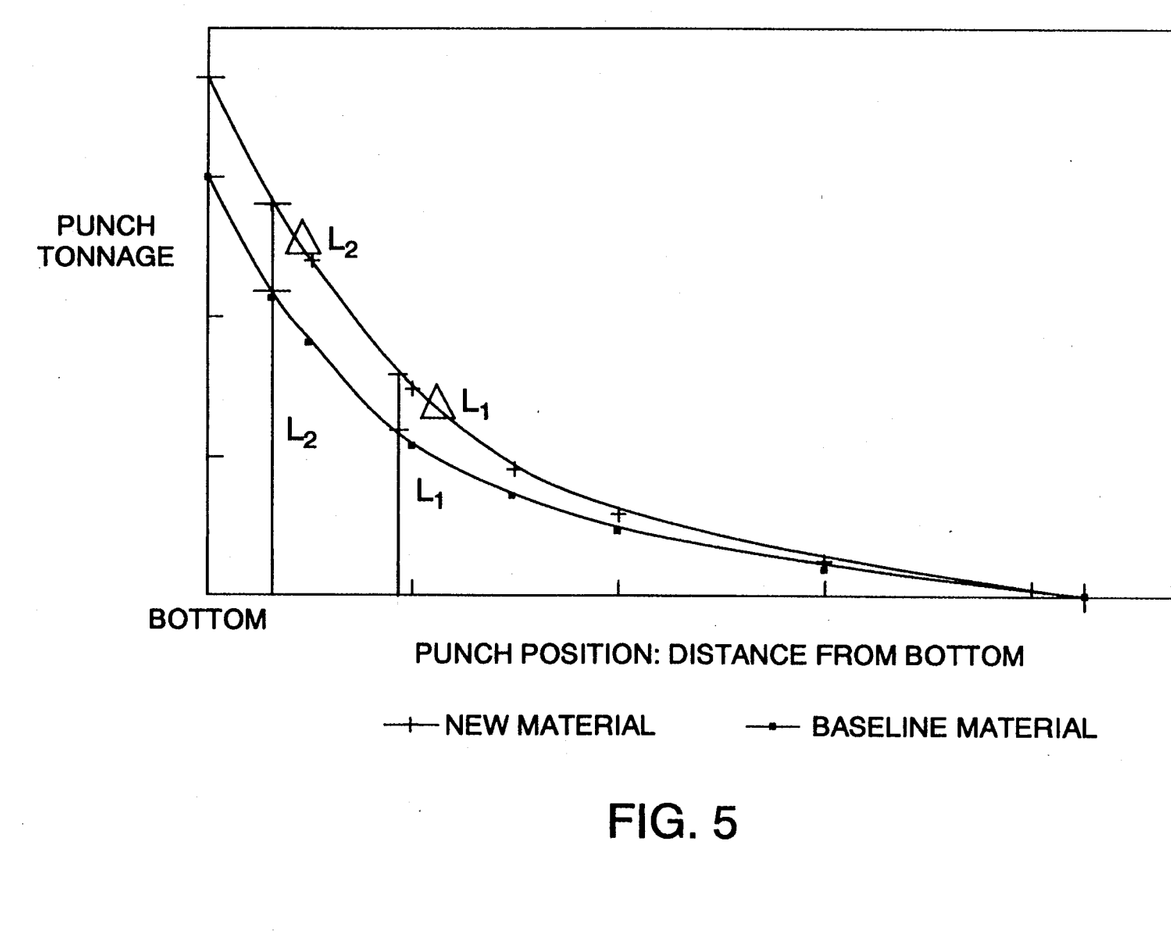
FIG. 5 is a graphical plot of punch tonnage versus punch position for a baseline sheet metal stock and a new batch of sheet metal stock, illustrating a drift in punch tonnage.

Referring now to FIG. 5, there is shown a graphical plot of two punch tonnage signatures over time (punch position): a first signature for a baseline sheet metal stock and a second signature for a new batch of sheet metal stock. As shown, there is an increase in tonnage associated with the new sheet metal, compared to the tonnage associated with the baseline sheet metal. This increase in tonnage, which is indicative of a change in the sheet metal stock, can then be expressed as a fractional tonnage deviation from the baseline at the respective locations. To determine the change in thickness, the average of these fractional tonnage deviations is determined. Furthermore, the difference between fractional tonnages at the two locations can be determined. This difference represents the change in slope. If the difference happens to be zero, the slope is unchanged. If the tonnage deviation at one location, expressed as a fraction, changes more than the other, then the difference represents the change in slope. This can then be plotted in the control chart with a mean of zero to determine change in work hardening coefficient.

It is understood, of course, that while the form of the invention herein shown and described constitutes the preferred embodiment of the invention, it is not intended to illustrate all possible forms thereof. It will also be understood that the words used are words of description rather than limitation, and that various changes may be made without departing from the spirit and scope of the invention as disclosed.

I claim:

1. A method of monitoring the operation of a stamping press including a punch and a die for forming parts from a blank, the method comprising:
- selecting at least two ram locations at which a press variable measurement will be made;
- operating the stamping press so as to produce production parts to measure a production press operating variable at the locations for each production part produced;
- operating the stamping press so as to produce a predetermined number of baseline parts to measure baseline mean press operating variables at the locations;
- processing the press operating variables to obtain press operating parameters;
- determining a deviation of the press operating variables from the baseline mean press operating variables; and
- comparing the press operating parameters to predetermined operating limits representing limits within which acceptable stampings are produced;
- wherein the step of processing includes estimating a deviation in the blank thickness (dTh) based on the press operating parameters for the locations.

2. The method of claim 1 wherein the deviation in blank thickness is estimated according to the following relationship:

$$dTh = ((\Delta Lf_2 + \Delta Lf_1)/2) * (B_t)$$

wherein $\Delta Lf_2$ and $\Delta Lf_1$ are deviations in the production press operating variables from associated baseline mean press operating variables expressed as fractions, and $B_t$ is the thickness of the blank used to form the baseline parts.

3. The method of claim 1 wherein the step of processing includes estimating a parameter (dN) proportional to a deviation in the work hardening coefficient based on the production press operating variables at the locations.

4. The method of claim 3 wherein the parameter (dN) is estimated according to the following relationship:

$$dN = (\Delta Lf_2 - \Delta Lf_1)$$

wherein $\Delta Lf_2$ and $\Delta Lf_1$ are deviations in the production press operating variables from associated baseline mean press operating variables expressed as fractions.

5. A method of monitoring the operation of a stamping press including a punch and a die for forming parts from a blank, the method comprising:
- selecting at least two ram locations at which a press variable measurement will be made;
- operating the stamping press so as to produce a predetermined number of baseline parts to measure a baseline mean tonnage at the locations;
- operating the stamping press so as to produce production parts to measure a press tonnage at the locations for the production parts produced;
- establishing operating limits based on the baseline mean tonnages at the locations, the operating limits representing limits within which the stamping process is in control or producing acceptable parts;
- processing the tonnages at the locations to obtain press operating parameters, the processing including determining a deviation of the tonnages from the baseline mean tonnages; and
- estimating a deviation in the blank thickness (dTH) based on the production tonnages at the locations.

6. The method of claim 5 wherein the deviation in the blank thickness is estimated according to the following relationships:

$$dTH = ((\Delta Lf_2 + \Delta Lf_1)/2) * (B_t)$$

wherein $\Delta Lf_2$ and $\Delta Lf_1$ are deviations in the production tonnages from the associated baseline mean tonnages expressed as fractions, and $B_t$ is the thickness of the blank used to form the baseline parts.

7. The method of claim 5 wherein the step of establishing includes estimating a parameter (dN) proportional to a deviation in the work hardening coefficient based on the production tonnages at the locations.

8. The method of claim 7 wherein the parameter (dN) is estimated according to the following relationship:

$$dN = (\Delta Lf_2 - \Delta Lf_1)$$

wherein $\Delta Lf_2$ and $\Delta Lf_1$ are deviations in the production tonnages from the associated baseline tonnages expressed as fractions.

9. For use with a stamping press including a punch and a die for forming parts, a system for monitoring the process of forming the parts, the system comprising:
- means for selecting at least two ram locations at which a press variable measurement will be made while the press is operating;
- means for measuring a baseline mean operating variable at the locations while a predetermined number of baseline parts are being produced;
- means for measuring a press operating variable at the locations while production parts are being produced;
- means for establishing operating limits based on the baseline mean operating variables, the operating limits representing limits within which the stamping process is in control or producing acceptable parts;
- means for processing the press operating variables to obtain press operating parameters, including means for estimating a deviation in the blank thickness (dTH), based on the press operating variables for the locations, according to the following relationship:

$$dTH = ((\Delta Lf_2 + \Delta Lf_1))$$

wherein $\Delta Lf_2$ and $\Delta Lf_1$ are deviations in the production operating variables expressed as fractions, and $B_t$ is the thickness of the blank used to form the baseline parts; and
- means for comparing the press operating parameters to the operating limits for the purpose of process control.

10. The system of claim 9 wherein the means for processing includes estimating a parameter (dN) proportional to a deviation in the work hardening coefficient, based on the production operating variables for the locations, according to the following relationship:

$$d = (\Delta Lf_2 - \Delta Lf_1)$$

wherein $\Delta Lf_2$ and $\Delta Lf_1$ are deviations in the production operating variables expressed as fractions.

* * * * *